May 5, 1970
M. E. COLAW
3,509,995
CONVEYOR AND STACKER FOR FILLER FLATS
Filed May 22, 1968
2 Sheets-Sheet 1
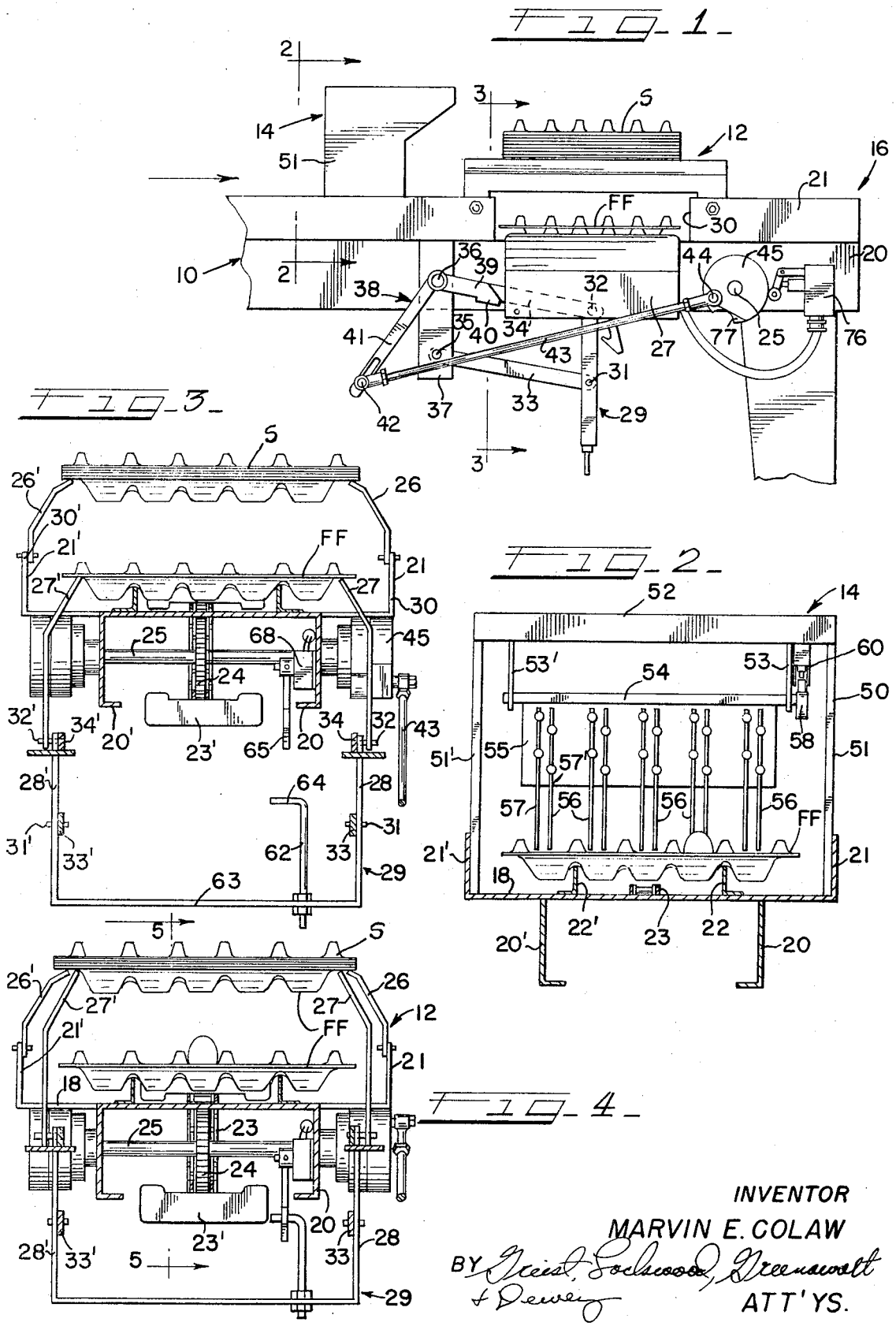
INVENTOR
MARVIN E. COLAW
BY
ATT'YS.

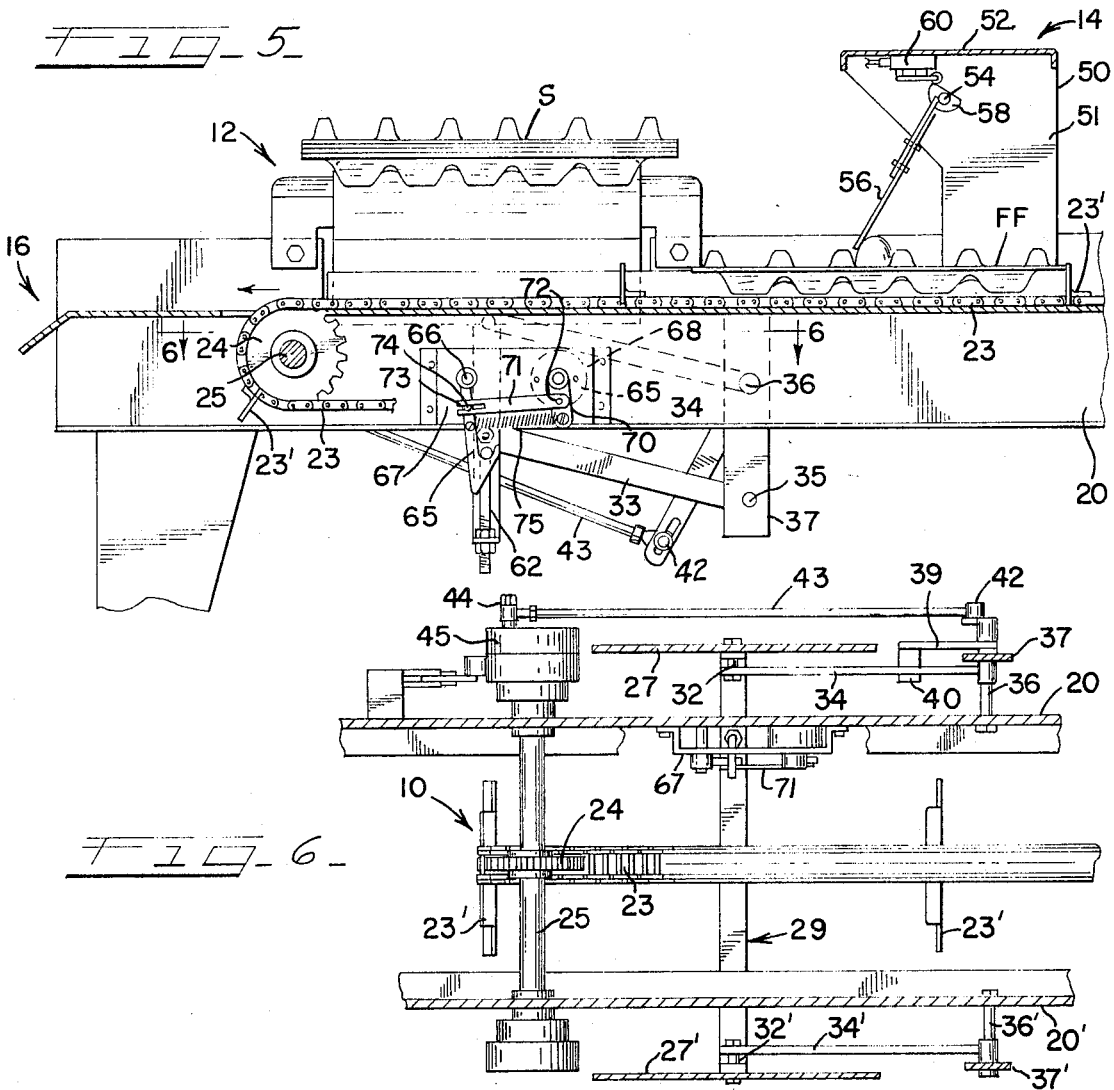

United States Patent Office 3,509,995
Patented May 5, 1970

3,509,995
CONVEYOR AND STACKER FOR FILLER FLATS
Marvin E. Colaw, Topeka, Kans., assignor, by mesne assignments, to Seymour Foods, Inc., Topeka, Kans., a corporation of Delaware
Filed May 22, 1968, Ser. No. 731,116
Int. Cl. B07c 5/344
U.S. Cl. 209—73                              12 Claims

ABSTRACT OF THE DISCLOSURE

Apparatus for use with a traveling conveyor on which filler flats for packing shell eggs are transported and which has associated means for stacking the filler flats after the eggs have been removed, which apparatus is characterized by a plurality of probes arranged to sense the presence of a whole egg or egg liquid in the pockets of the filler flats as they advance to a stacking area and a control mechanism which is operative to disable the stacking means when activated by the sensors so as to prevent stacking of filler flats which are not in condition for reuse due to the presence of a stuck egg or egg liquid in one or more of the pockets thereof.

---

This invention relates to egg handling machinery and is more particularly concerned with improvements in an apparatus which is especially adapted for conveying filler flats, or the like, to an unloading station for transfer of the eggs therefrom and for thereafter stacking the empty filler flats for subsequent reuse.

Shell eggs are conventionally delivered to a packing area or other processing center in 30-dozen packing and shipping crates which are almost universally used in the bulk shipment and storage of eggs. The eggs are packed in the crates by supporting them on tray-like pocketed filler flats which also function as separators and each of which comprises upwardly opening egg receiving pockets arranged in rows of 5 to 6 so as to accommodate on each filler flat 2½ dozen eggs. Various arrangements have been provided for transporting filler flats filled with eggs to a transfer station where the eggs are removed by a lifter device and transferred to a processing machine such as for example an egg washing machine. One such conveying apparatus is disclosed in Willsey Pat. No. 3,231,118, dated Jan. 25, 1966. In that apparatus the filler flats are placed on a traveling conveyor and carried to a transfer station where a reciprocating transfer head picks up successive rows of the eggs and transfers the same to a washing machine conveyor. As the filler flats are emptied of their load of eggs they are advanced to a stacking device which lifts each successive filler flat into a stack supported over the path of the conveyor. In the use of such equipment it has been found desirable to provide some arrangement for examining the filler flats as they are emptied and for removing those which are not in condition for reuse due to the presence in the pockets of a whole egg or a substantial part thereof which has not been removed or liquid egg material resulting from a broken egg. It is an object, therefore, of the present invention to provide an apparatus for use with a filler flat conveyor which will examine each successive filler flat and, when a "stuck egg" or liquid egg material is detected in a pocket which renders it unfit for re-use, withhold it from the stack and deliver the same to a reject station.

It is a general object of the invention to provide a conveyor for filler flats or similar containers for eggs or the like having a mechanism for stacking the containers for subsequent reuse and a sensing device for sensing the presence in a pocket of a container of an egg or parts thereof which renders the container unfit for immediate reuse and for disabling the stacking mechanism when a container in such condition is detected so as to stack only those containers which are suitable for reuse.

A more specific object of the invention is to provide a conveyor for egg carrying filler flats or similar pocketed article carrying trays having a stacker to which the filler flats are delivered after the eggs are removed therefrom and a device for sensing the presence in one or more pockets of the filler flat of an egg or egg liquid resulting from egg breakage and a failure to remove all the contents of the pocket with a control mechanism for the stacker operating mechanism which is responsive to the sensing device so that the stacker is disabled when a soiled filler flat is detected and the latter is carried to an ejector station where it is removed from the apparatus.

It is another object of the invention to provide a detector mechanism for controlling the operation of a conveyor and an associated stacking mechanism so as to enable a soiled egg tray to be separated from a line of trays which have been emptied of eggs and which are conveyed to a stackng area where the unsoiled trays are delivered to a stack for reuse.

These and other objects and advantages of the invention will be apparent from a consideration of the apparatus for conveying filler flats and associated detecting and stacking mechanism which is shown by way of illustration in the accompanying drawings wherein:

FIG. 1 is a side elevation at the discharge end of an endless conveyor having an associated device for stacking empty filler flats and a detecting device for actuating a mechanism controlling the stacking device so as to disable the stacking device when a filler flat is advanced to the same in a pocket of which there is a struck egg or liquid egg material;

FIG. 2 is a cross section taken on the line 2—2 of FIG. 1 to an enlarged scale;

FIG. 3 is a cross section taken on the line 3—3 of FIG. 1 to an enlarged scale;

FIG. 4 is a cross section taken on the same plane as FIG. 3 but with the parts in a different position;

FIG. 5 is a longitudinal vertical sectional view taken on the line 5—5 of FIG. 4;

FIG. 6 is a fragmentary horizontal section taken on the line 6—6 of FIG. 5 to an enlarged scale; and FIG. 7 is a diagrammatic view illustrating the electrical control arrangement for the apparatus.

In handling eggs in bulk it is the usual practice to pack the eggs for shipping and storage in 30-dozen crates or cartons with the eggs disposed in layers and supported in the pockets of filler flats which also act as separators between the layers and which have aligned egg receiving pockets arranged in five rows of six eggs each. The filler flats are presently made of molded pulp or molded plastic and they are adapted for reuse, with the molded plastic type being washable when they become soiled by broken eggs, which may occur in the course of removing the eggs or during handling or shipping. When the molded pulp filler flats are soiled during handling they are generally discarded.

In modern processing operations apparatus has been developed for conveying filler flats which are filled with eggs to a transfer station where the eggs are removed by a lifter head, which may remove a row at a time or all six rows at once, for delivery to a conveyor, or the like, for a processing operation. In the illustrated apparatus the filler flats or egg trays FF are advanced on an endless conveyor 10, the discharge end of which is shown in FIG. 1 and the eggs are removed by a mechanism which is not shown. If the eggs are in normal condition and there are no cracked or broken ones the transfer mechanism will ordinarily remove all of the eggs leaving a clean filler flat of delivery to a stacking mechanism 12 in condition for subsequent reuse. If any of the eggs are broken or stuck in the pockets of a filler flat so that they are not removed by the transfer device the soiled filler flat is detected as it is passed beneath a sensing device 14 and control mechanism for the stacking device 12 is actuated so as to prevent the soiled filler flat from being elevated into the stack, allowing the same to be advanced by the conveyor 10 to the discharge end 16 where it is ejected into a collection container (not shown) or otherwise removed from the machine.

The conveyor 10 comprises an elongate horizontally disposed table, supported on laterally spaced frame forming channels 20 and 20', and having upstanding side flanges 21 and 21' extending along the side margins. Angle bars 22 and 22' are disposed on the table 18 in laterally spaced relation on opposite sides on an endless chain 23 and support the filler flats FF as they are advanced along the table 18 by pushers 23' carried on the chain 23. The chain 23 is supported on end sprockets 24 and cross shafts 25 only one set of which are shown in FIG. 5 of the drawings.

The flat stacking mechanism 12 comprises laterally spaced side plates 26 and 26' which are secured by suitable fasteners to the table side flanges 21 and 21' and are bent inwardly towards the center of the conveyor a sufficient distance to form supports for a stack S of the filler flats FF, as shown in FIG. 1, 3 and 4. The plates 26 and 26' have sufficient resiliency or are mounted so that they will spring apart a sufficient degree to permit a filler flat to be pushed up between them and nested onto the bottom of the stack S with the plates 26 and 26' springing back into stack supporting position when the filler flat clears the top edges of the plates, as illustrated in FIGS. 3 and 4. The mechanism for elevating the filler flats into the stack S comprises a pair of elongate generally rectangular side plates 27 and 27' which are secured in a suitable manner at the top of free ends of the vertically disposed legs 28 and 28' of a cross frame 29 disposed beneath the table 18. The table side flanges 21 and 21' are cut away at 30 and 30' to provide clearance for the vertical reciprocation of the elevating plates 27 and 27'. The supporting frame 29 is pivotally connected at 31, 31' and 32, 32' to pairs of parallel link bars 33, 33' and 34, 34' at opposite sides of the supporting frame which link bars have their other ends pivotally connected at 35, 35' and 36, 36' to depending brackets 37, 37' on the bottom of the conveyor 10. At one side of the machine a bell crank 38 is mounted on the pivot 36 and has the shorter arm 39 thereof provided with a flange section 40 at the bottom edge extending beneath the top most link bar 34 at that side of the machine. The other arm 41 of the bell crank 38 is connected by a pin and slot connection 42 to one end of a pitman rod 43 which has its other end pivotally connected at 44 to crank forming plate 45 which is carried on the cross shaft 25. The stacking plates 27, 27' are raised and lowered intermittently by operation of the crank 45 so that the movement thereof is synchronized with the movement of the conveyor 10.

The sensor device 14 (FIGS. 2 and 5) comprises an inverted U-shaped supporting frame 50 having vertically disposed side plates 51 and 51' and a top cross plate 52 with depending brackets 53 and 53' between which there extends a shaft 54 on which there is mounted a support plate 55 of insulating material with spaced pairs of probes 56, the individual probes 57, 57' of each pair thereof being laterally spaced and being of a sufficient length to extend diagonally downwardly from the supporting shaft 54 with their bottom ends adapted to project into the pockets in a filler flat FF when the latter is supported on the conveyor 10 and moved beneath the probes. The shaft 54 carries at its one end a small cam plate 58 which is adapted to control the operation of a shell egg sensor switch 60 mounted on the top cross plate 52. The cam plate 58 is constructed and arranged on the shaft 54 so as to provide a track for a cam follower on the operating arm of the switch 60 which will operate to close the normally open switch 60 when the probes are tilted to a predetermined angle by contact with a whole egg remaining in one of the pockets of the filler flat FF. The ends of the probes 57 and 57' of each pair thereof extend into the pockets of the filler flat FF and are of opposite polarity so that when there is liquid therein they act as a switch closing the control circuit which is shown in FIG. 7 and which will be hereinafter described.

An upwardly extending latch member 62 is mounted on the cross bar 63 of the cross frame 30 with a laterally bent upper end 64 which is positioned for engagement by a depending hook 65 when in its uppermost position. The latch hook 65 is pivoted at 66 on the inside face of a bracket 67 mounted on the side frame member 20. A rotary solenoid 68 is mounted on the bracket 67 and has a swinging arm 70 to which one end of a link 71 is pivoted at 72 with its other end forked at 73 and engaging a pin 74 on the hook arm 65. A tension spring 75 connects the hook arm 65 with the end of arm 70 on the rotary solenoid so as to provide for swinging of the hook 65 in a counterclockwise direction, as viewed in FIG. 5, for engagement with the latch member 62 on the elevator frame 30.

Referring to FIG. 7 each pair of the liquid sensor probes 56 which are disposed in alignment with the rows of egg pockets so as to extend into the same as the filler flat advances and which are charged with opposite polarity, are connected into the control circuit so as to close the circuit when a pair of the probes contact a liquid surface. The sensor arm switch 60 is connected into a parallel circuit which includes a neon tube and a network of resistors, so that closing the circuit triggers the neon tube and fires it into conduction when a stuck egg in a filler flat causes the sensor arm to lift past a predetermined point. When either circuit is closed an amplifier is activated which in turn energizes the rotary solenoid 68. This closes the latching mechanism and holds the stacker frame 30 in the "up" position until the filler flat FF which is to be rejected passes through the stacking station and into the rejected filler flat container. The solenoid circuit remains energized until the cycle is completed and the sensor arms drop between the filler flats at which time a reset switch 76 is operated by a cam 77 carried on the conveyor end shaft 25 which opens the circuit and puts the stacker mechanism back into operation to stack the next clean filler flat.

I claim:

1. An apparatus for conveying and stacking relatively shallow tray-like containers which are characterized by one or more rows of pockets adapted to accommodate shell eggs, or similar articles, which articles normally project above the topmost surface of the container when seated in the pockets, said apparatus comprising a conveyor for advancing the containers to a stacking station, means at the stacking station for removing successive empty containers from the conveyor and stacking the same, a device mounted above the path of containers advancing on the conveyor for sensing the presence of an article or a liquid deposit in a pocket of a container, and means responsive to operation of said sensing device to interrupt the operation of said container removing and stacking means so as to allow a container to be advanced through the stacking station when an article or a liquid deposit is detected in a pocket thereof by the sensing device.

2. An apparatus for conveying and stacking relatively shallow tray-like containers which are characterized by one or more rows of pockets adapted to accommodate shell eggs, or the like, which apparatus comprises a conveyor for advancing the containers to a stacking station, means at the stacking station for removing successive empty containers from the conveyor and stacking the same, a device mounted along the path of containers advancing on the conveyor for sensing the presence of an egg or a liquid deposit in a pocket of a container, and means responsive to operation of said sensing device to control the operation of said container removing and stacking means so that the containers are advanced past the stacking station when an egg or a liquid deposit is detected in a pocket thereof by the sensing device.

3. An apparatus as set forth in claim 2 and said means for removing containers from the conveyor and stacking the same including a reciprocating frame which engages the containers and shifts the same from the conveyor, and said means for controlling the operation of said container removing and stacking means including a latching device which is operative in response to the operation of the sensing device for latching said reciprocating frame in non-operating position.

4. An apparatus as set forth in claim 2 and said means for removing containers from the conveyor and stacking the same including reciprocating means for shifting the containers from the conveyor and into a stack, and said means for controlling the operation of said container removing and stacking means comprising a device which is under the control of said sensing device for latching the container shifting means in an inoperative position so as to clear the conveyor for advance past the stacking station of containers having an egg or liquid deposit in a pocket thereof.

5. An apparatus as set forth in claim 2 and said means for removing the containers from the conveyor and stacking the same comprising a pair of laterally spaced vertically disposed stacking plates at opposite sides of the path of the containers, a stack supporting means above the conveyor, means for reciprocating said stacking plates so as to normally lift a container from the conveyor and carry it into the stack, and a latching device which is operative under the control of said sensing device for holding said stacking plates in elevated position so as to clear a path for advance without stacking of containers in which an egg or a liquid deposit has been detected by said sensing device.

6. An apparatus as set forth in claim 5 and said latching device comprising a hook member and means for engaging said hook member with cooperating means on said stacking plates in an elevated non-operative position.

7. An apparatus as set forth in claim 2 and said sensing device comprising a plurality of probes which are mounted above the path of the containers in alignment with the pockets therein and which are operative to sense the presence of an egg or a liquid deposit in the pockets as the containers are advanced beneath same.

8. An apparatus as set forth in claim 2 and said sensing device comprising a cross shaft mounted above the path of said conveyor with one or more probes mounted thereon which probes are disposed to be swung about the axis of said cross shaft when an egg is encountered in a container pocket and the means to control the operation of the container removing and stacking means including a switch which is actuated by predetermined swinging movement of said probes.

9. An apparatus as set forth in claim 2 and said sensing device including one or more probes which are disposed to project into pockets of the containers and to detect the presence of a liquid therein.

10. In an apparatus for handling relatively shallow tray-like containers which are characterized by one or more rows of pockets adapted to accommodate articles, such as shell eggs, which normally project above the top surface of the container when seated in the pockets, a container supporting conveyor and a device mounted along the conveyor for sensing the presence of an article or a liquid deposit in a pocket of a container advanced past said device and means responsive to the operation of said sensing device to separate from other containers any container having an article or a liquid deposit in a pocket thereof.

11. In an apparatus as set forth in claim 10, and said sensing device comprising a plurality of sensor probes mounted for movement into and out of the pockets of said containers, as they are advanced past said sensing device by said conveyor to detect the presence of an article or a liquid deposit therein.

12. In an apparatus as set forth in claim 10, and said sensing device comprising a plurality of sensor probes mounted on a pivotal frame for swinging movement to bring the free ends thereof into and out of the pockets of said containers as they are advanced past said sensing device by said conveyor to detect the presence of an article or a liquid deposit therein.

References Cited

UNITED STATES PATENTS

| 2,601,922 | 7/1952 | Fahey | 209—60 |
| 2,922,519 | 1/1960 | Radley | 53—53 X |
| 3,053,387 | 9/1962 | Foss et al. | 209—90 |

ALLEN N. KNOWLES, Primary Examiner

U.S. Cl. X.R.

53—53; 209—75, 81, 90